Dec. 9, 1969        E. SCHMITT        3,482,365
METHOD AND DEVICE FOR FASTENING JAMB LININGS
Filed March 11, 1968        2 Sheets-Sheet 1
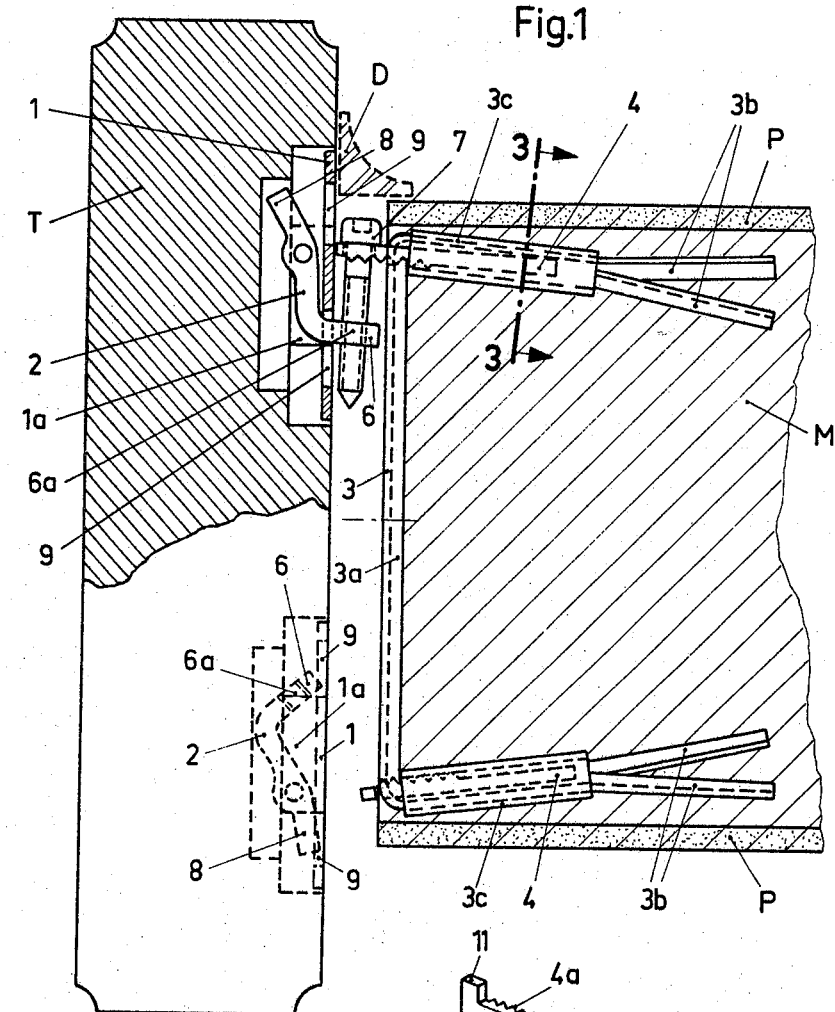
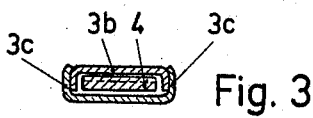
Fig. 3
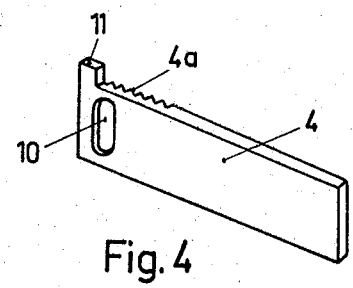
Fig. 4
INVENTOR
EMIL SCHMITT Dec. 9, 1969  E. SCHMITT  3,482,365
METHOD AND DEVICE FOR FASTENING JAMB LININGS
Filed March 11, 1968  2 Sheets-Sheet 2
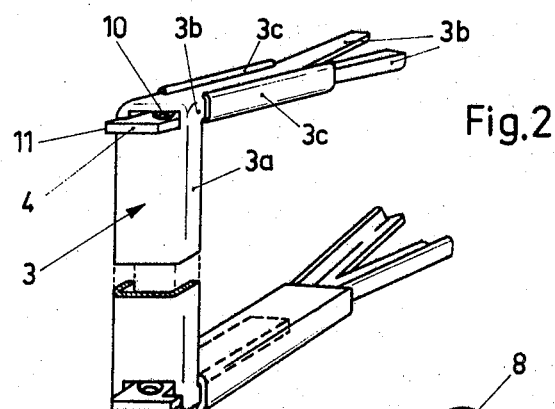
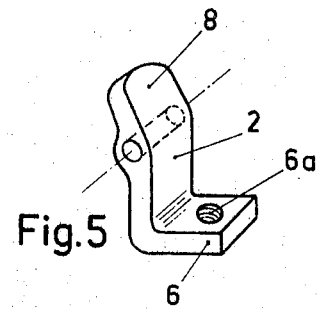
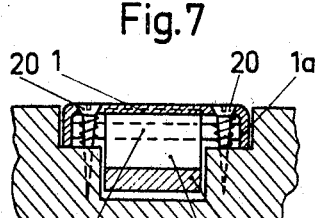
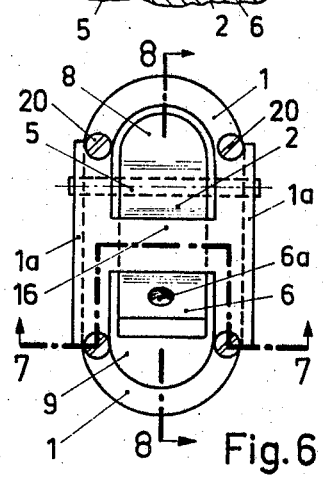
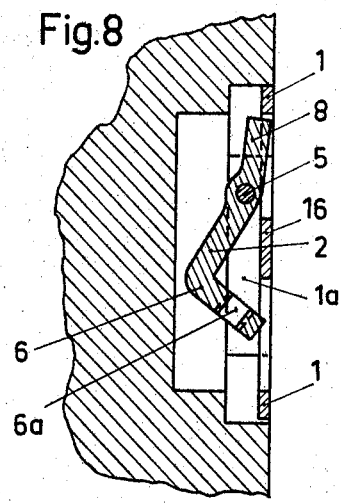
INVENTOR
EMIL SCHMITT

United States Patent Office 3,482,365
Patented Dec. 9, 1969

3,482,365
METHOD AND DEVICE FOR FASTENING JAMB LININGS
Emil Schmitt, 8702 Guntersleben, uber Wurzburg, Germany
Filed Mar. 11, 1968, Ser. No. 713,276
Claims priority, application Germany, Mar. 11, 1967, Sch 40,376
Int. Cl. E06b 1/24, 1/60
U.S. Cl. 52—204     11 Claims

ABSTRACT OF THE DISCLOSURE

A method of fastening pre-fabricated jamb linings to an end of a wall structure and using cramp irons which are adapted to fit into the masonry of the wall structure comprises using a special mounting jig to insert leg portions of the cramp irons into the masonry, preferably adjacent each wall edge, in a manner such that a bridge portion extends across the edge of the wall in which the jamb is to be fitted. Thereafter, shim plates are directed from the end of the wall into hollow spaces defined by the leg portions of the cramp irons in a manner such that a slotted openings of the shims is exposed outwardly from the end of the wall. The jamb lining is prepared by securing hinge plate elements into defined recesses on the jamb lining which are spaced apart by an amount equivalent to the width of the wall structure and comparable to the length of the bridge of the cramp irons. The hinge plate elements include holding angles which are pivotally mounted on the hinge plate elements and which include a leg portion which may be precisely located between the jamb lining and the cramp irons in order to permit insertion of a set screw or holding screw through the slot of the shim and into the projecting leg portion of the holding iron.

---

The apparatus for carrying out the method includes the hinge plate element carrying the holding angles and the cramp irons having the adjustable shim plates which are locked into position in a leg portion of the cramp irons.

Summary of the invention

This invention relates in general to a method and apparatus for fastening jamb linings in doorways and the like, and in particular to a new and useful method of securing a jamb lining in position adjacent an edge of a wall structure wherein the cramp irons are inserted into the end of the wall structure and embedded in the masonry and carry shims at each end with slots through which securing bolts are directed to engage into threaded portions of holding angles secured to a jamb lining.

It is known to fasten jamb linings at predetermined places in the masonry by inserting cramp irons by means of a mounting jig into the masonry and then attaching hinge plates (door loops) of the finished linings in an adjustable arrangement and thereafter taring the connection in vertical and horizontal directions. In such an arrangement, tiltable angles are disposed in both of the cramp iron legs to which the braced side flanges of the door hinges are attached by screws. Such an arrangement sometimes requires too much space. In addition, the tilting of the angles disposed in the cramp irons to position them in a screw-in position is very difficult to carry out. In addition, the protruding legs of the angles prevent a flush fitting of the hinge plates so that they tend to block the passage of the side flanges of the jamb lining which is to be inserted. In addition, because of the relatively wide space between the cramp irons and the jamb lining, the plaster in the angle must be applied by means of special plastering jigs having special angle rails and angle bar holders.

In accordance with the present invention, there is provided an apparatus and method for installing jamb linings in a manner such that the relatively large space which was heretofore required between the cramp irons and the jamb lining is reduced to a minimum. In addition, the method and apparatus provide an improved mechanical connection between the cramp iron and the jamb lining and at the same time eliminates the requirement for the application of plaster at an acute angle.

In accordance with the method and apparatus of the invention, cramp irons having inwardly bent legs are mounted in the masonry such that the legs extend into the masonry adjacent each wall surface and a bridge portion extends across the wall width in which the jamb lining is to be mounted. The cramp irons are advantageously attached to a special mounting jig, and they are mounted into the masonry at predetermined places by such a jig. After the jig is removed, shims which are carried within recesses of each leg portion are withdrawn outwardly from the end of the wall by means of a screw driver or similar device. The shims carry oblong slots, and securing screws or set screws are inserted through the slots and secured into holding angles which are mounted on the jamb lining. The holding angles are pivotally mounted on hinge plate elements which are secured flush to the surface of the jamb linings. The holding angles are pivotal and they may be properly oriented with the receiving threaded opening of one leg portion aligned with the oblong slot of the shim by depressing an opposite leg portion during the installation. The shims are provided with vertically arranged securing teeth adjacent their outer or front portions and these shims are jammed obliquely into the hollow leg portions of the cramp irons after the plaster has been applied flush with the joint of the masonry. A rectangular rib flange is advantageously secured around the jamb adjacent the masonry on both sides in order to provide the usual finished appearance.

Accordingly it is an object of the invention to provide an improved method of installing a jamb lining in a masonry wall structure.

A further object of the invention is to provide an apparatus for securing jamb linings to a wall end which includes cramp irons having a bridge portion which extends across the width of the wall structure and carries cramp iron legs which extend into the masonry, the cramp iron legs including shim elements having oblong slots which may be withdrawn outwardly from the edge of the wall to receive securing bolts which extend therethrough and are threaded into holding angles which are pivotally carried on hinge plate elements which are mounted flush on the jamb linings.

A further object of the invention is to provide an apparatus for mounting jamb linings which includes adjustable shim plate members which are carried on the wall structure and holding angles which are mounted on the jamb lining which may be adjusted by finger pressure to permit alignment of the holding angle with the shim plate element to permit insertion of a securing bolt through the shim plate member and into the holding angles.

A further object of the invention is to provide a jamb lining mounting structure which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Brief Description of the Drawings

In the drawings:

FIG. 1 is a partial horizontal section through a wall structure and jamb lining constructed in accordance with the invention;

FIG. 2 is a perspective view of a cramp iron used in the construction of FIG. 1;

FIG 3 is a section taken on the line 3—3 of FIG. 1;

FIG. 4 is a perspective view of a securing shim;

FIG. 5 is a perspective view of a holding angle which is carried on the hinge plate elements of the jamb lining;

FIG. 6 is a plan view of a hinge plate element;

FIG. 7 is a section taken on the line 7—7 of FIG. 6; and

FIG. 8 is a section taken on the line 8—8 of FIG. 6;

Detailed Description of the Preferred Embodiment

Referring to the drawings in particular, the invention embodied therein comprises an apparatus and method for mounting a jamb lining T in position adjacent an end of a masonry wall M which is covered on each side surface with plaster P.

In accordance with the invention, cramp irons generally designated 3 are secured in the masonry wall M and fastened to holding angles 2 which are carried on hinge plate elements 1 which are secured to the jamb lining T.

In accordance with a feature of the invention, the cramp irons 3 include a bridge portion 3a which extends across the end of the masonry wall M and leg portions 3b which extend into the masonry wall adjacent each side surface. Each leg portion 3b is of U-shaped configuration and defines a recess with an enclosed leg element 3c for receiving a shim 4. The shim 4 is shown in detail in FIG. 4 and is of a flat plate configuration and includes tooth-like elements 4a defined along a flat surface thereof which engage against a surface of the leg portion 3b in order to tightly hold the shim in position. An enlarged cam portion 11 prevents the shim 4 from being withdrawn entirely into the leg portion and it permits the outward removal of the shim 4 by an amount to expose an oblong slot 10 in a position for securing the jamb lining T in position to the wall.

In accordance with a further feature of the invention, the jamb lining T is provided with a recess adjacent each side edge which aligns with the respective legs 3b, 3b of the clamp irons 3. Hinge plate elements 1 are mounted flush into the recesses provided, as indicated in FIG. 7, and are secured in position by securing screws 20. The hinge plate elements 1 each carry a pivot bolt 5 which pivotally mounts the holding angle 2. Each holding angle 2 includes a first arm or adjustment arm portion 8 and a second arm or securing arm portion 6 having a threaded opening 6a.

In accordance with the method of the invention, when the jamb lining T is aligned against the end of the wall M and the shims 4 are in a withdrawn position to expose the slot 10, securing bolts or set screw members 7 are directed through the oblong slot and threaded into the threaded bore 6a. The holding angles 2 are adjusted to properly orient the bore 6a in alignment with the slot 10 by depressing the adjusting portion 8 by an amount to properly orient and align the securing portion 6 of the holding angles 2. In the drawing of FIG. 1, the upper holding angle 2 is already secured but the lower holding angle is shown within the recess of the jamb lining T. The lower holding angle 2 may be shifted by pressing the adjusting portion 8 inwardly to expose the bore 6a in alignment with the slot 10 of the shim 4 after the shim is first pulled outwardly from its associated leg portion 3b. After the screws 7 are secured on both sides, a taring or fitting of the jamb lining in a vertical and horizontal direction is possible. It is also possible to screw the set screw 7 with opposite tensile stresses.

The cramp irons 3 have U-shaped flange leg portions 3b, 3b which may be split at the outer ends thereof. The teeth 4a of the shim 4 engage against the interior wall of each of the leg portions 3b.

As best seen in FIG. 6, the hinge plate element 1 is provided with an oval opening 9 to permit the outward movement of the securing leg portion 6 of the holding angle 2. The center bridge 1b prevents the leg 6 from projecting outwardly too far. The side portions 1a, 1a define journal supports for the pivot pin 5.

It is, of course, possible to use instead of the two hinge plate elements 1 a single continuous hinge plate of similar design having means for holding one or two holding angles, as desired.

The new method of fastening the jamb linings in accordance with the invention provides considerable reduction of the gap between the cramp irons 3 and the masonry M and the plaster P, and also between the hinge plate elements and the jamb lining. This results in a number of advantages.

The individual constructional elements, both of the jamb lining and of the cramp irons, are almost flush with these parts, and this provides an advantage in the transportation and storage of such parts. This provides a further advantage for the mounting of these elements since it is possible to pass the jamb lining, including the door, by the cramp irons and only then to pull or press the elements to be connected out of the building parts after the positioning is effected.

Thus, with the method of the invention, the fastening or finished jamb linings may be accomplished when the distance between the masonary and the lining is only approximately 10 mm., that is, only 20 mm. when considering both sides of the door or jamb lining, as compared to more than twice that distance in the prior methods. Such an arrangement permits a solid fit of the door in the wall and easy adjustment of the securing elements by the tension screwing of the bolts to the shims and the holding angles.

Because the spacing between the parts has been reduced, it is possible to apply the plaster continuously to the joint instead of plastering approximately at an acute angle over the overhanging joint. This is a considerable advantage since applying plaster over an acute angle by a plastering jig is complicated and very difficult. In addition, the plaster has a tendency to break off even when it is secured by an edge rail. This is eliminated by the present inventive construction and method. It is now only required that the plastering jig is arranged with the legs directed straight in respect to te masonary wall, and plastering may be carried out up to the point of the angle itself, so that the plaster will be flush with the joint of the masonary and it is only necessary to apply a narrow rib flange D between the plaster wall and the finished jamb lining.

While a specific embodiment of the invention has been shown and described in detail to illustrate the application of the inventive principles, it will be understood that the invention may be embodied otherwise without departing from such principles.

What is claimed is:

1. A method of securing a jamb lining having a hinge fitting element with a holding angle pivoted therein to a cramp iron having two spaced leg portions engaged in the end edge of a masonry wall, each of said leg portions of said cramp iron carrying a shim plate which may be withdrawn outwardly from the wall edge, comprising arranging the jamb lining adjacent the wall edge in a manner to align the holding angles with each leg portion of said cramp iron, withdrawing the shim plates to expose a securing slot of the shim plate and directing a securing bolt through the slot, aligning one of the holding angles to position a threaded bore in a leg portion thereof in alignment with the securing bolt and securing the bolt which has passed through the slot of the shim into the threaded bore of the holding angle, and thereafter attaching the other of the holding angle by directing a securing bolt through an opening in the shim plate and threading it into the threaded bore of the holding iron.

2. A method of securing a jamb lining according to claim 1, wherein the holding angle on one side of the wall structure is secured to its associated shim plate by a threaded securing bolt and thereafter the holding angle on the opposite side of the structure is secured.

3. A method of securing a jamb lining according to claim 1, wherein the holding angles include a pivotal member having an adjusting leg portion and a securing leg portion, the securing leg portion being recessed within a recess of the jamb lining, and comprising adjusting the leg portion of said holding angles so that the securing leg portion is pushed outwardly from the jamb to expose a threaded hole therein for receiving the securing bolt which is directed through the slot of the shim.

4. A method of securing a jamb lining according to claim 3, wherein the holding angles of opposite sides of the wall structure are screwed in with oppositely directed tensile stress after plaster is applied over the wall surfaces up to the jamb lining.

5. A method of securing a jamb lining according to claim 4, including attaching a rib flange between the jamb lining and the wall.

6. A device for securing a jamb lining in a wall opening, comprising a fastening element secured to the jamb lining, a holding angle pivotally mounted in said fastening element and having at least one leg portion with a threaded bore which may be oriented beyond the edge of the jamb lining, a cramp iron having at least one leg portion secured in the wall and having a bridge portion extending substantially across the width of the wall, a shim member secured to said leg portion of said cramp iron and having an oblong slot, and a securing bolt extending through the slot of said cramp iron and threaded into the threaded bore of said holding angle.

7. A device according to claim 6, wherein said holding angle is a double-armed member having an adjusting arm portion and a securing arm portion having the threaded bore, said securing arm portion being contained within a recess of the jamb lining and being deflectable inwardly to force the securing arm portion outwardly beyond the jamb lining for alignment therewith with the oblong slot of said shim plate.

8. A device according to claim 6, wherein said shim plate comprises an elongated flat member having teeth adjacent its outer end engaged with a respective leg portion of said cramp iron.

9. A device according to claim 8, wherein said shim member includes a cam portion at its outer end and having said slot adjacent said outer end to permit engagement of said slot by a screw driver for withdrawal of said shim plate to facilitate alignment therewith of the bore of the holding angle.

10. A device according to claim 6, wherein said cramp iron includes leg portions adjacent each end of the wall, each being of a substantially U-shaped configuration and an enclosing leg portion covering the open end of the U-shaped configuration, said shim member being slidable between said leg portion and said enclosing leg portion.

11. A device according to claim 6, including a finishing rib disposed between the surface of said wall and said jamb lining.

References Cited

UNITED STATES PATENTS

| 1,807,527 | 5/1931 | Harry | 292—256.75 |
| 2,064,984 | 12/1936 | Marsh | 52—709 |
| 3,098,266 | 7/1963 | Oehmiz | 52—204 |

FOREIGN PATENTS

| 10,836 | 1886 | Great Britain. |
| 10,455 | 1892 | Great Britain. |
| 258 | 1897 | Great Britain. |
| 963,169 | 1964 | Great Britain. |
| 325,942 | 1935 | Italy. |

HENRY C. SUTHERLAND, Primary Examiner

U.S. Cl. X.R.

29—464, 526; 52—208, 213, 709, 741